July 14, 1953  F. W. HAYWARD ET AL  2,645,169
HIGH-SPEED CAMERA

Filed Aug. 5, 1949  2 Sheets-Sheet 1

Inventors
Frank W. Hayward
Charles J. Zablocki
By M. O. Hayes
Attorney

Inventors
Frank W. Hayward
Charles J. Zablocki

By

Attorney

Patented July 14, 1953

2,645,169

UNITED STATES PATENT OFFICE 2,645,169

HIGH-SPEED CAMERA

Frank W. Hayward, Takoma Park, and Charles J. Zablocki, Silver Spring, Md.

Application August 5, 1949, Serial No. 108,832

3 Claims. (Cl. 95—17)

(Granted under Title 35, U. S. Code (1952), sec. 266)

The present invention relates to high speed cameras, and more particularly to improvements in rotatable drum cameras of the type disclosed in the copending application of Harry H. Hall for Method and Apparatus for High Speed Photography, Serial No. 692,157 filed August 22, 1946, now Patent No. 2,551,597, wherein a film strip is carried by the drum adjacent the periphery thereof.

In the aforesaid copending application, a high speed camera is disclosed in which a drum mounted for rotation within a casing is employed. The drum is constructed in such a manner as to retain a strip of film at the cylindrical periphery thereof whereby upon rotation of the drum at high speed past an optical opening in the casing of the camera the film will be constantly retained tangent to the focal plane of a lens positioned adjacent the optical opening and provided for focusing images to be photographed on the film.

A rotating drum type camera of the type disclosed in the copending application is well adapted to photograph transient images such, for example, as those appearing on the fluorescent screen of a cathode ray oscilloscope. It often is desirable to spread such transient images over a long time axis in order to bring out minute variations in the image and for this purpose the film on which the image is photographed is rotated at a high rate of speed such, for example, as 42 feet per second or higher.

In order to attain such high speeds without damage to the film and at the same time maintain the film precisely tangent to the focal plane of the lens, it has been found particularly advantageous to mount the film in a rotating drum. In the Hall application heretofore referred to, such a drum has been disclosed which comprises a cylindrical member composed of an inner and an outer annular member having a space provided therebetween for the insertion of a film strip. The inner annular member and the web provided for the support thereof are formed of metal, the inner annular member being provided with a slot for the insertion and removal of the film. The outer annular member is secured to the inner member and is formed of a transparent plastic material.

While the film carrying drum of the Hall application is generally well adapted for the purpose intended, several disadvantages have been discovered. In the first place, it has been found that it is particularly difficult to feed the film through the slot of the inner annular member into the space between the annular members. In addition to the difficulty in loading, there is also the possibility that the tab of film normally extending through the slot may be lost in the space between the annular members which would necessitate the disassembly of the two members. In the second place the prior art drum is expensive and difficult to construct, it being constructed to a large extent of metal and, therefore, it must be accurately machined and because of its weight it must be delicately balanced in order to ensure smoothness of operation at high speeds.

In the device of the present invention the difficulties of the prior art device have been obviated to a great extent. The loading and removal of the film has been greatly facilitated by providing only one annular member having an open channel around the inner surface thereof, the side walls of the channel being cut back so that the film is snapped into place in the channel. The drum, including the aforesaid one annular member, is constructed of one piece of translucent plastic thereby eliminating the costly structural features of the prior art device, and being made of a single piece of lightweight plastic the necessity for delicate balancing is obviated.

It is also to be noted that the entire camera has been improved to provide a more compact and efficient arrangement.

An object of the present invention is to provide a new and improved high speed camera having a rotating film retaining drum which is readily loaded and unloaded.

Another object is to provide a rotating drum for a high speed camera in which economical construction is an important feature.

Still another object is to provide a new and improved high speed camera which is readily attached to the enclosure ring of a cathode ray oscilloscope.

Still another object is to provide a new and improved high speed camera which is compact and neat in appearance.

A further object is to provide a rotating film retaining drum for a high speed camera which retains the film securely and tangent to the focal plane of the focusing lens.

A still further object is to provide a rotating film retaining drum composed of translucent plastic for a high speed camera which is light in weight and therefore capable of high speed rotation with a minimum of vibration.

Other objects and many of the attendant advantages of this invention will be readily appreciated as the same becomes better understood by reference to the following detailed description when considered in connection with the accompanying drawings wherein.

Figure 1:
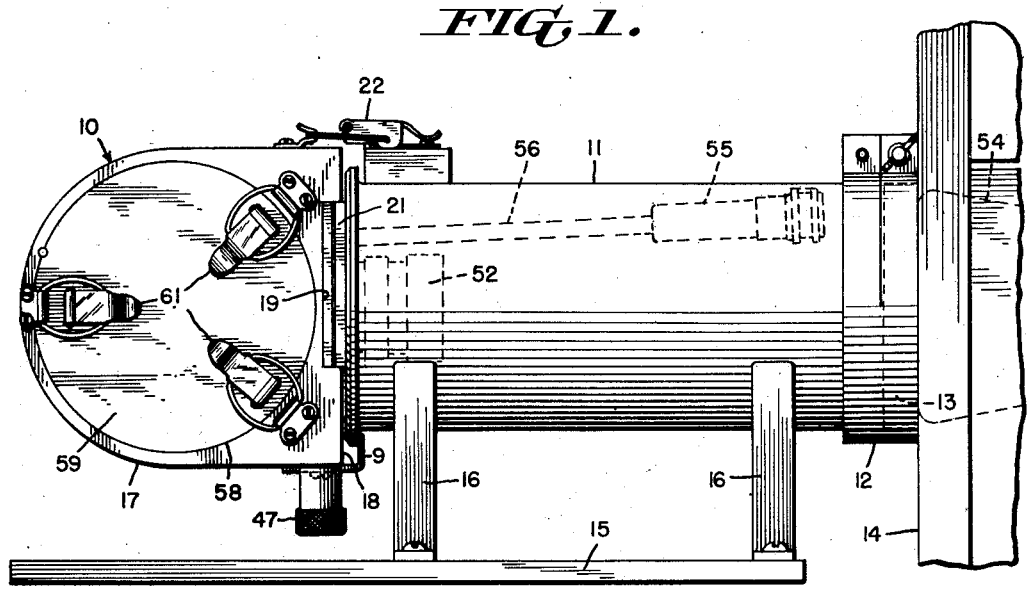
Fig. 1 is a side elevational view of a high speed camera and associated apparatus in which the device of the present invention may be employed.
Figure 2:
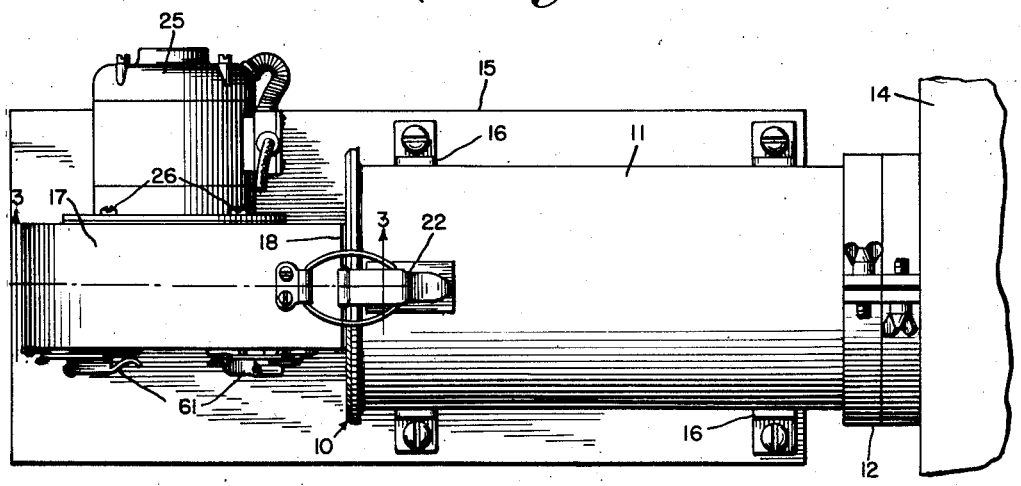
Fig. 2 is a view in top plan of the camera and apparatus illustrated in Fig. 1.

Referring more particularly to the drawings wherein like numerals indicate like parts throughout the several views a high speed camera is indicated generally at 10. The camera 10 is arranged to record on a strip of film the movement of a cathode ray beam under the influence of an electronic circuit as employed in various test devices. In the present instance the camera 10 comprises a tubular body member 11 having a dual clamping member 12 at one end thereof. One portion of the clamp 12 engages the enclosure ring 13 mounted on the face panel of a cathode ray oscilloscope housing 14, while the other portion engages the body member 11, as aforesaid.

The body member 11 is mounted over a base plate 15 by means of a pair of brackets 16. Supported on body member 11 is a casing 17 of substantially circular formation and having a flat wall 18 at one side thereof. The wall 18 is provided with a recess 19 adapted to receive a projection 21 formed on the end wall of member 11. The foregoing arrangement is for the purpose of aligning the casing 17 with respect to member 11.

Casing 17 is releasably secured to member 11 by means of a finger 9 having an upturned end to engage the flange of member 11 at the bottom and a fastener 22 at the top.

Formed within the casing 17 is a cylindrical chamber 23 having communication with the camera casing 11 by means of a pair of apertures 20 and 24 adjacent wall 18 of the casing.

An electric motor or other prime mover 25 is secured to one side of the casing 17 by means of screws or the like 26. An opening 27 is provided in the casing whereby shaft 28 of motor 25 may project interiorly of the casing. Fixedly secured to shaft 28 is a hub member 29 having a threaded shank 31 and a circular flange 32. Flange 32 has a pair of projecting pins 34 mounted in the outer face thereof.

A transparent plastic drum 35 being of hollow cylindrical conformation and having one side closed by a wall 36 is arranged to be mounted on hub 29, a central orifice 33 being provided in wall 36 to receive the shank 31 of the hub and a pair of openings 37 being provided in the wall to receive the pins 34. A thumb nut screwed on shank 31 firmly secures the drum on the hub and pins 34 prevent relative rotational movement of the drum and hub. Annular portion 38 of the drum is provided on the inner face thereof with a concentric channel 39 for receiving a strip of photographic film 41, the edges of the channel being cut back at an angle of approximately 10° as at 42.

Figure 3:
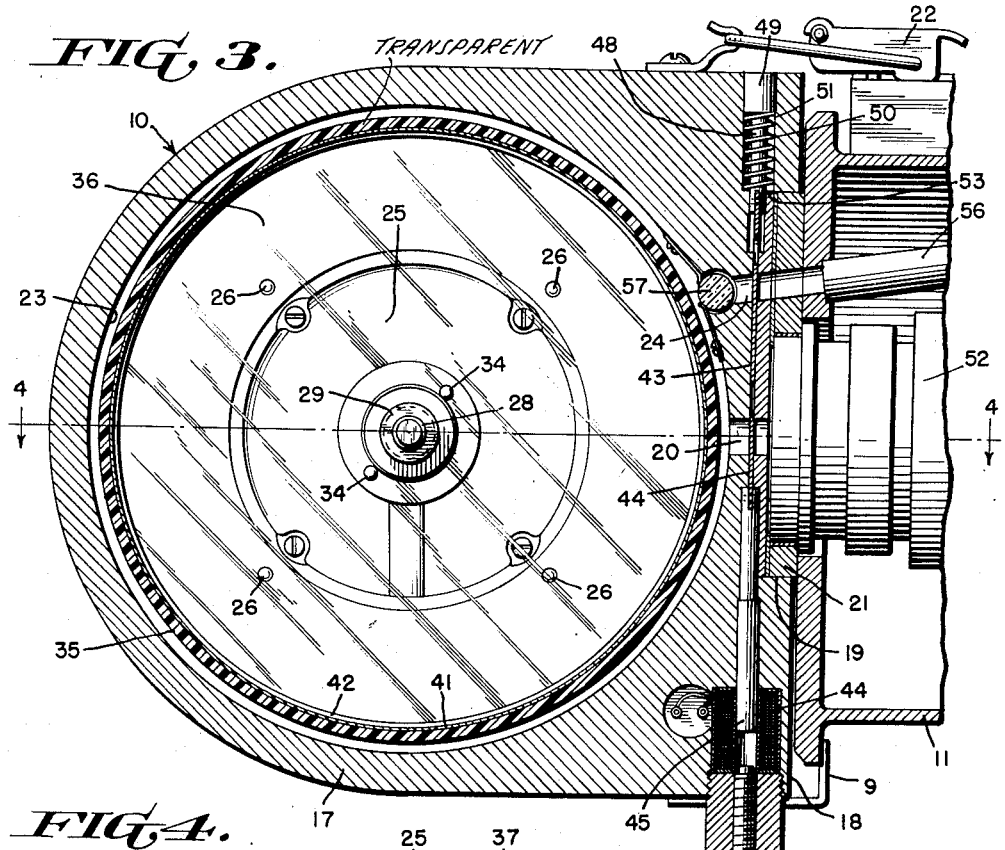
Fig. 3 is a sectional view taken along the line 3—3 of Fig. 2.
Figure 4:
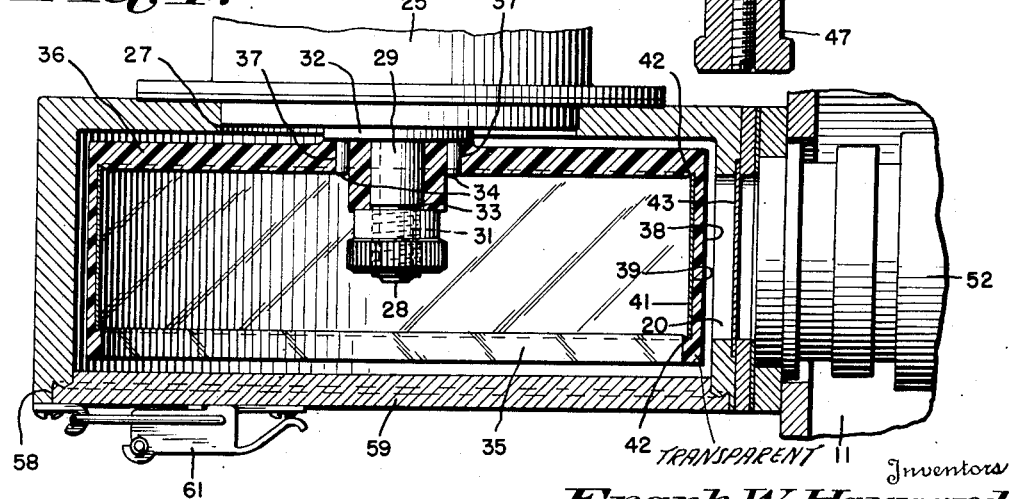
Fig. 4 is a sectional view taken along the line 4—4 of Fig. 3.

By referring to Figs. 3 and 4 it will be apparent that there has been provided a film carrying drum in which the film may be readily inserted or removed therefrom. It is also apparent that as the film is wider than the width of the outer portion of the channel of the drum, the film will be firmly held in the channel prior to the operation of the camera.

During rotation of the drum, the film will be held flat against the face of the channel through the action of centrifugal force, thus all of the film will be held concentric with relation to the axis of rotation of the drum.

As illustrated in Figs. 3 and 4, a shutter 43 is arranged in slot 44 for closing the apertures 20 and 24. The shutter 43 may be operated by a solenoid 44 having a movable core 45 attached to one end of shutter 43. Solenoid 44 is secured in bore 46 in casing 17 by means of threaded plug 47. In order to return the shutter to the normal or closed position after movement to the open position under influence of the solenoid, a rod 48 is attached to the opposite end of the shutter, the rod having a head 49 adapted to ride in bore 51 and having a spring 50 interposed between the head 49 and a shoulder 53 in the bore 51.

Mounted in projection 21 and extending into member 11 is a lens assembly 52. The axes of drum 35, aperture 20, lens assembly 52, and cathode ray tube 54 mounted in housing 14 are in parallel alignment. Thus, it will be seen that, assuming that lens assembly 52 is properly focused, an image appearing on cathode ray tube 54 will be clearly recorded on film 41 as drum 35 is rotated by motor 25 when shutter 43 is opened during one revolution of the drum.

Neon tube 55 is mounted within tubular member 11 and is connected in a flasher circuit (not shown) whereby the tube will flash instantaneously at predetermined intervals measured in fractions of a second as the shutter 43 is open. The beam of light emanating from tube 55 is enclosed by an opaque shade 56 to prevent interference with the recording of the image of cathode ray tube 54.

Tube 55 is in alignment with aperture 24. Mounted in aperture 24 is a cylindrical lens 57 adapted to convert the beam of light from neon tube 55 to a narrow strip of light extending across the film 41. The foregoing arrangement is for the purpose of applying markings to the film to indicate periods of time.

An opening 58 is provided in the side of casing 17 in order to permit access to the drum 35. The opening 58 is formed with a recess to provide for flush mounting of a cover plate 59. Fasteners 61 are arranged to releasably secure the cover plate 59 to casing 17.

It is apparent from the foregoing description that the present invention provides a high speed camera which is compact and neat in appearance, and in which the film drum is constructed in a simple manner of a transparent plastic material and having features providing for easy loading and removal of the film.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed and desired to be secured by Letters Patent of the United States is:

1. A high speed camera comprising a hollow cylindrical drum of a lightweight plastic material adapted to carry a film strip adjacent the periphery thereof, said drum comprising a circular web, a translucent cylindrical member integral with the periphery of said web at one end of said cylindrical member, the inner surface of said translucent cylindrical member being provided with a shallow channel of width substantially the same as the width of said film strip, the side walls of said channel being undercut to provide means for anchoring said film strip in said channel, the inner surface of said cylindrical member providing support for said film strip over the entire area thereof whereby centrifugal force acting on said film strip upon rotation of said drum forces said film strip against the inner surface of said translucent cylindrical member, said hollow drum being open at one end thereof to permit access to the hollow interior thereof for insertion of said film strip in said channel.

2. In a high speed camera of the class disclosed, a translucent drum comprising a circular web, a transversely disposed flange formed along the entire periphery of said circular web and integrally therewith, a channel recessed within the inner surface of said flange of a width sufficient to receive a strip of film, the edges of said channel being undercut approximately 10° and in spaced relationship such that said film may be snapped over the undercut edges into the channel to a position in continuous surface contact with said flange.

3. In a high speed camera of the type disclosed, a translucent drum having a circular end face and cylindrical wall portion integrally formed therewith, the other end of said drum being open, a channel formed in the inner surface of said cylindrical wall portion of a width sufficient to receive a strip of film, the edges of said channel being undercut whereby a strip of film may be snapped over the undercut edges into the channel to a position in surface contact with said cylindrical wall portion and upon rotation of said drum the film will be retained in position against said cylindrical wall portion by centrifugal force.

FRANK W. HAYWARD.
CHARLES J. ZABLOCKI.

References Cited in the file of this patent
UNITED STATES PATENTS

| Number | Name | Date |
| --- | --- | --- |
| 1,252,829 | Mueller | Jan. 8, 1918 |
| 1,536,716 | Kade | May 5, 1925 |
| 2,167,417 | Chappell et al. | July 25, 1939 |
| 2,259,228 | Rankin | Oct. 14, 1941 |
| 2,353,328 | Winston | July 11, 1944 |
| 2,372,774 | Finch | Apr. 3, 1945 |
| 2,394,225 | Ashford | Feb. 5, 1946 |
| 2,477,847 | Zarem et al. | Aug. 2, 1949 |
| 2,505,469 | Gerardin | Apr. 25, 1950 |
| 2,551,597 | Hall | May 8, 1951 |

FOREIGN PATENTS

| Number | Country | Date |
| --- | --- | --- |
| 796,844 | France | Feb. 3, 1936 |